July 2, 1929.  E. F. TURNER  1,719,735
LOOSE LEAF THONG MECHANISM
Filed Nov. 19, 1928
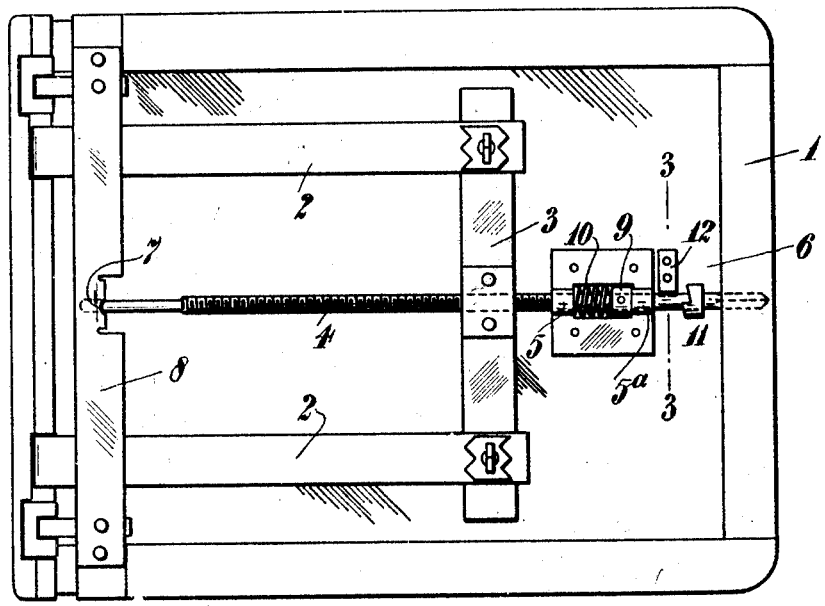
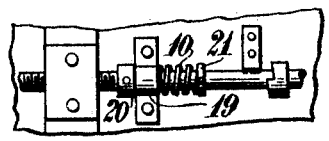
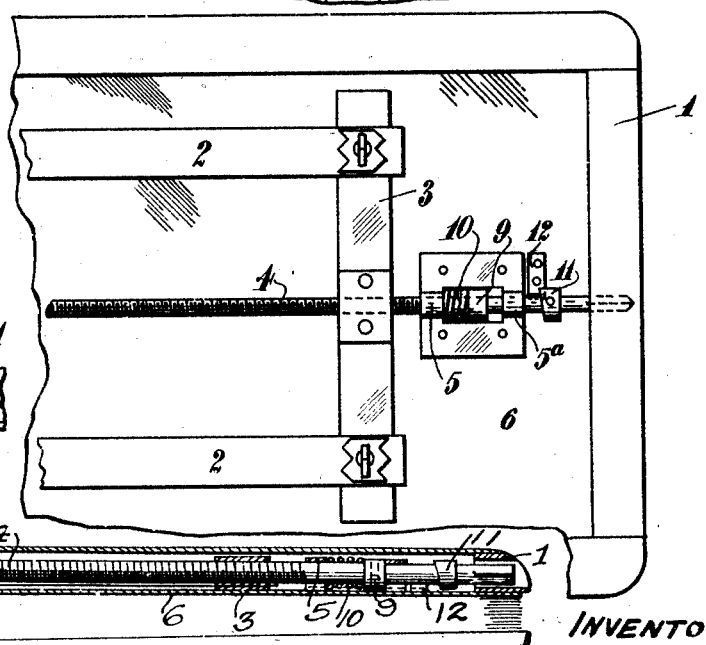
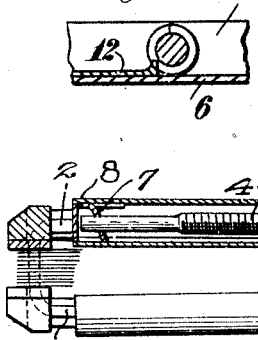
INVENTOR
E. F. TURNER.
By P. H. Blair
ATTY.

Patented July 2, 1929.

1,719,735

UNITED STATES PATENT OFFICE.

ELSIOR FRANK TURNER, OF ERDINGTON, BIRMINGHAM, ENGLAND, ASSIGNOR TO WILLIAM VENNARD, OF LONDON, ENGLAND.

LOOSE-LEAF THONG MECHANISM.

Application filed November 19, 1928, Serial No. 320,497, and in Great Britain October 19, 1927.

This invention relates to improvements in loose-leaf binders of the thong type employing a threaded operating spindle.

An object of the present invention is to provide improved means for preventing further rotation of the spindle when the leaves are sufficiently clamped.

According to one feature of the present invention there is provided in a loose-leaf binder of the thong type employing a threaded operating spindle, an expanding and contracting device on the said spindle, so arranged and operating that when the leaves are sufficiently clamped the threaded operating spindle moves forward to bring a normally out of action stop member thereon, into locking relationship with a stop which positively prevents any further rotation of the spindle taking place.

According to another feature of the present invention there is provided in a loose-leaf binder of the kind referred to, the combination of an expanding and contracting device on the spindle and a simple stop device, whereby the spindle, normally free for rotation, is locked against further rotation when the leaves are sufficiently clamped.

The bearing member on the spindle may be made with an expanding and contracting part and a rigid part.

The accompanying drawings show one way of carrying the present invention into practice.

In the drawings:—

Fig. 1 is a plan view of a binder with the outside or front face of one cover removed, and showing the stop member out of action. Fig. 2 is a similar view but showing the stock member in the position in which further clamping of the leaves is prevented. Fig. 3 is a detail sectional view through the line 3—3 of Fig. 1. Fig. 4 is a view of a modified construction. Fig. 5 is a part sectional elevational view of Fig. 1.

In the constructional example illustrated, the cover 1 is made up in any suitable way. The thongs 2 are connected to a thong stretcher bar 3. The threaded operating spindle 4 is mounted in a thrust bearing 5, 5ª and a loose bearing 7 on the back edge 8 of the binder formed by bending up a part of the said back edge.

The thrust bearing is secured to one of the sheets 6 of the cover, and is a two-part bearing having bearing parts 5, 5ª. Between these two parts the spindle 4 carries a collar 9 and a spring member 10. The collar 9 is riveted to the spindle 4. The collar 9 and spring 10 form together a bearing member on the spindle made up of an expanding and contracting part and a rigid part.

A stop device is fitted away from the thrust bearing parts. This stop device is termed a simple stop device inasmuch as it has a simple function only, and is not a double purpose device having the compound functions of a stop and a thrust collar.

In the example shown the stop device comprises a radial dog member 11 on the spindle 4 and a stop member 12 fixed to the face sheet 6 of the cover. The dog member 11 is normally out of action as shown in Fig. 1.

When the thongs are sufficiently tightened the spring member 10 is contracted and the operating spindle 4 moves axially forward to bring the dog 11 into locking relationship with the stop member 12 so as to positively prevent any further rotation of the spindle taking place. This locking position is shown by Fig. 2.

As shown in Fig. 4 the thrust bearing may have a single bearing part 19, in which case a collar 20 on the spindle contacts with the left hand face of the bearing part 19, and a retaining member or collar 21 secured to the spindle is provided for that end of the spring 10 remote from the right hand face of the bearing part 19.

The invention is not limited to the particular stop device illustrated and furthermore the simple stop device may be located at any convenient part of the operating spindle.

What I claim is:—

1. In a loose-leaf binder of the character described, in combination, two cover members between which the leaves are adapted to be bound, thongs on which the leaves are removably mounted, a stretcher bar associated with one end of the thongs, an operating spindle for said bar, bearings for said spindle associated with one of the cover members including a thrust bearing, a spring associated with said spindle and thrust bearing whereby the spindle may be moved axially to compress said spring, and stop members on the spindle and cover adapted to engage each other when said spindle has moved axially owing to the leaves having become sufficiently clamped.

2. In a loose-leaf binder of the character described, in which the leaves are adapted to be clamped between two cover members, in combination, thongs on which the leaves are removably mounted, a bar associated therewith, an operating spindle cooperating with said bar, bearings for said spindle adapted to be carried by one of said cover members, spring means associated with said spindle and bearings, whereby said spindle may be moved axially against the action of said spring when the leaves are sufficiently clamped, and means on said spindle and said cover member located remote from said bearings adapted to be brought into engagement when said spindle moves axially thereby to prevent any further rotation of the spindle when the leaves are sufficiently clamped.

3. In a loose-leaf binder of the character described, in which the leaves are adapted to be clamped between two cover members, in combination, a thong stretcher bar, an operating spindle for said bar, spaced bearings for said spindle adapted to be carried by one of said cover members, a thrust collar on said spindle, and a spring buffer on said spindle and located between said collar and one of said bearings whereby said spindle may have axial play, a dog member on said spindle located remote from said bearings, and a stop member on said cover adapted to cooperate with said dog member when the spindle has moved axially, thereby to prevent further rotation of the spindle when the leaves are sufficiently clamped.

In testimony whereof I affix my signature.

ELSIOR FRANK TURNER.